(12) United States Patent
Cleary et al.

(10) Patent No.: US 7,565,892 B1
(45) Date of Patent: Jul. 28, 2009

(54) METHOD AND APPARATUS FOR CONTROLLING MODE TRANSITION IN A SPARK-IGNITION DIRECT-INJECTION INTERNAL COMBUSTION ENGINE

(75) Inventors: David J. Cleary, West Bloomfield, MI (US); Jyh-Shin Chen, Troy, MI (US); Qi Ma, Farmington Hills, MI (US)

(73) Assignee: Gm Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/024,593

(22) Filed: Feb. 1, 2008

(51) Int. Cl.
*F02B 17/00* (2006.01)
(52) U.S. Cl. .................. 123/295; 123/299
(58) Field of Classification Search ............... 123/295, 123/299
See application file for complete search history.

(56) References Cited

U.S. PATENT DOCUMENTS

| | | | |
|---|---|---|---|
| 6,561,158 B2* | 5/2003 | Yoshida et al. | 123/295 |
| 6,932,175 B2* | 8/2005 | Teraji et al. | 180/65.23 |
| 7,240,659 B2* | 7/2007 | Yang | 123/295 |
| 7,328,683 B2* | 2/2008 | Weiss et al. | 123/299 |
| 2003/0168037 A1* | 9/2003 | zur Loye et al. | 123/295 |
| 2004/0194746 A1* | 10/2004 | Yamaoka et al. | 123/90.15 |
| 2005/0217246 A1* | 10/2005 | Naik | 60/285 |
| 2006/0196466 A1* | 9/2006 | Kuo et al. | 123/295 |
| 2008/0173277 A1* | 7/2008 | Otterspeer et al. | 123/295 |
| 2008/0178836 A1* | 7/2008 | Yamashita et al. | 123/295 |

* cited by examiner

*Primary Examiner*—Erick Solis (57) ABSTRACT

The disclosure sets forth operating a spark-ignition, direct-fuel injection internal combustion engine, including transitioning the engine from operating in a stratified charge combustion mode to operating in a homogeneous charge combustion mode. External EGR flow is discontinued, and an in-cylinder trapped air mass and an in-cylinder EGR mass in an air intake system of the engine are estimated. Engine throttle position is controlled to achieve trajectories for air/fuel ratio and the in-cylinder EGR mass determined based upon the estimated in-cylinder trapped air mass and the in-cylinder EGR mass in the air intake system. A double-injection fueling strategy and a single-injection fueling are used during the transition.

20 Claims, 6 Drawing Sheets

METHOD AND APPARATUS FOR CONTROLLING MODE TRANSITION IN A SPARK-IGNITION DIRECT-INJECTION INTERNAL COMBUSTION ENGINE

TECHNICAL FIELD

This disclosure is related to control of spark-ignition direct injection internal combustion engines.

BACKGROUND

The statements in this section merely provide background information related to the present disclosure and may not constitute prior art.

Internal combustion engines, especially automotive internal combustion engines, generally fall into one of two categories, spark ignition engines and compression ignition engines. Known spark ignition engines function by introducing a fuel/air mixture into a combustion chamber, which is compressed during a compression stroke and ignited using a spark plug. Known compression ignition engines function by introducing or injecting pressurized fuel into a combustion cylinder near top dead center (TDC) of the compression stroke, igniting upon injection. Other known compression-ignition engines include gasoline compression-ignition engines with fuel injected during the intake stroke and during the compression stroke and during the exhaust stroke when accompanied with variable valve timing. Combustion for both spark ignition and compression-ignition engines involves premixing or a diffusion flame front controlled by fluid mechanics.

SUMMARY

A method for operating a spark-ignition, direct-fuel injection internal combustion engine includes commanding the engine to transition from operating in a stratified charge combustion mode to operating in a homogeneous charge combustion mode. External EGR flow is substantially completely discontinued. In-cylinder trapped air mass and in-cylinder EGR mass are estimated. Trajectories for an air/fuel ratio and the in-cylinder EGR mass are determined and throttle position and engine fueling are controlled to achieve the trajectories. Air/fuel ratio is monitored. Double-injection fueling is initiated for each combustion cycle when the air/fuel ratio is less than a first predetermined threshold. And, single-injection fueling is initiated for each combustion cycle and spark retard management executed to control the engine output torque when the air/fuel ratio is less than a second predetermined threshold.

BRIEF DESCRIPTION OF THE DRAWINGS

One or more embodiments will now be described, by way of example, with reference to the accompanying drawings, in which.

DETAILED DESCRIPTION

Figure 1:
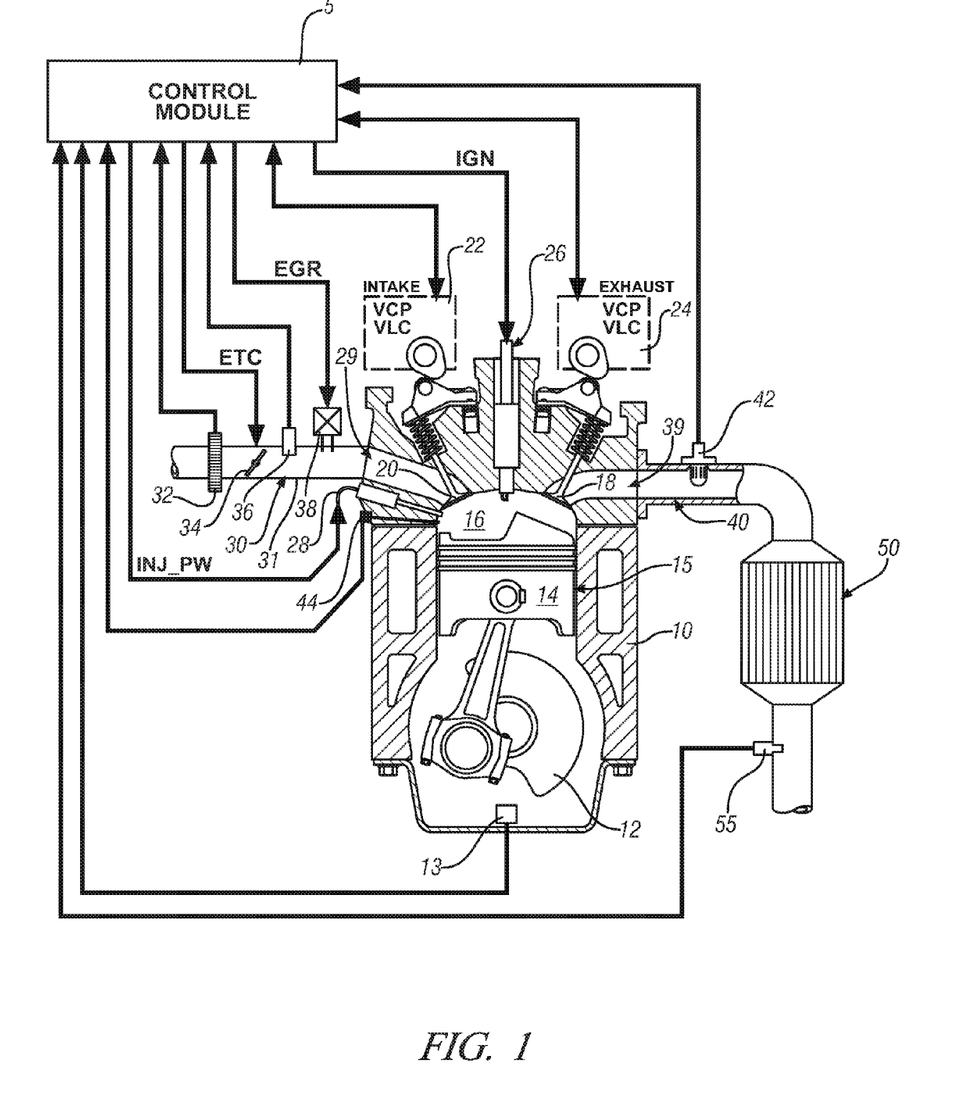
FIG. 1 is a schematic diagram of an engine and exhaust aftertreatment system, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 that have been constructed in accordance with an embodiment of the disclosure. The engine 10 comprises a multi-cylinder spark-ignition, direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1. The engine 10 is selectively operative in a stratified charge combustion mode and a homogeneous charge combustion mode. The stratified charge combustion mode includes operating at an air/fuel ratio that is lean of stoichiometry, for example an air/fuel ratio ranging from 25:1 to 40:1, with engine fueling including a single-injection fueling comprising a single fuel pulse which occurs late in a compression stroke, and a high level of dilution by internally and externally recirculated exhaust gas. Mass of the internally and externally recirculated exhaust gas trapped in each cylinder 15 is referred to herein as in-cylinder EGR mass. Alternatively, the engine can be operated in the stratified charge combustion mode with engine fueling comprising a dual fuel injection strategy, wherein a first injection event occurs during the compression stroke and a second injection event occurs outside the compression stroke. A high dilution EGR mass can be an in-cylinder EGR mass which is greater than 40% of a cylinder charge. An engine throttle valve 34 may be opened more during engine operation in the stratified charge combustion mode and closed more during engine operation in the homogeneous charge combustion mode. The homogeneous charge combustion mode includes operating at an air/fuel ratio that is at or near stoichiometry, preferably with single-injection fueling comprising a single fuel pulse which occurs during an intake stroke, and a low dilution in-cylinder EGR mass, e.g., less than 5% of the cylinder charge. The engine throttle valve 34 may be controlled to generate an engine output torque that is based upon an engine load including an operator torque request. The engine 10 may operate in the stratified charge combustion mode under light to medium engine loads. The engine 10 operates in the homogeneous charge combustion mode under heavier engine loads. The engine 10 further can be controlled to operate in the homogeneous charge combustion mode at a rich air/fuel ratio to regenerate an element of an exhaust aftertreatment system 50.

The engine 10 includes an air intake system 30 which channels and distributes intake air to each combustion chamber 16. The air intake system 30 is made up of air flow channels between the throttle valve 34 and engine intake valves 20, and preferably includes ductwork, an intake manifold 31, and intake passages 29. The air intake system 30 includes devices for monitoring and controlling the intake air flow therethrough. The devices for controlling the intake air flow preferably comprise the throttle valve 34 in this embodiment. The devices for monitoring the intake air flow preferably include a pressure sensor 36 adapted to monitor manifold absolute pressure and barometric pressure in the intake manifold 31. A mass air flow sensor 32 is preferably located upstream of the throttle valve 34 to monitor mass of the intake air flow and intake air temperature. The throttle valve 34 preferably comprises an electronically controlled device adapted to control the intake air flow to the engine 10 in response to a control signal ('ETC') from the control module 5. An external flow passage (not shown) recirculates exhaust gases from an exhaust manifold 40 to the air intake system 30, controlled by an exhaust gas recirculation (hereafter 'EGR') control valve 38. The control module 5 controls mass flow of exhaust gas to the air intake system 30 by controlling opening of the EGR control valve 38.

Engine valves, including intake valve(s) 20 and exhaust valve(s) 18 control flow into and out of each combustion chamber 16. The intake air flow from the intake passage 29 into the combustion chamber 16 is controlled by the intake valve(s) 20. Exhaust gas flow out of the combustion chamber 16 is controlled by the exhaust valve(s) 18 to an exhaust manifold 40 via exhaust passages 39. Openings and closings of the intake and exhaust valves 20 and 18 are preferably controlled with a dual camshaft (as depicted), the rotations of which are linked and indexed with rotation of the crankshaft 12. The intake and exhaust valves 20 and 18 may be controlled by devices 22 and 24. Device 22 preferably comprises a controllable mechanism operative to variably control valve lift ('VLC') and variably control cam phasing ('VCP') of the intake valve(s) 20 for each cylinder 15 in response to a control signal ('INTAKE') from the control module 5. Device 24 preferably comprises a controllable mechanism operative to variably control valve lift ('VLC') and variably control cam phasing ('VCP') of the exhaust valve(s) 18 for each cylinder 15 in response to a control signal ('EXHAUST') from the control module 5. Devices 22 and 24 each preferably comprises a controllable two-step valve lift mechanism operative to control magnitude of valve lift, or opening, to one of two discrete steps, e.g., a low-lift valve open position (typically about 4-6 mm) for low speed, low engine load operation, and a high-lift valve open position (typically about 8-10 mm) for high speed, high engine load operation. Devices 22 and 24 further comprise variable cam phasing mechanisms to control phasing, i.e., relative timing of opening and closing of the intake valve(s) 20 and the exhaust valve(s) 18 respectively, measured in crank angle degrees. The variable cam phasing mechanisms shift valve opening time relative to crankshaft and piston position. The VCP system preferably has a range of phasing authority of 40°-90° of crank rotation, thus permitting the control module 5 to advance or retard opening and closing of each of the intake valves 20 and the exhaust valves 18 relative to position of the piston 14. The range of phasing authority is defined and limited by the devices 22 and 24. Devices 22 and 24 are actuated using one of electro-hydraulic, hydraulic, and electric control force, controlled by the control module 5.

A fuel injection system comprises a plurality of high-pressure fuel injectors 28 which directly inject fuel into the combustion chamber 16. A fuel pulse is a mass of fuel injected into the combustion chamber 16 in response to a control signal ('INJ_PW') from the control module 5. The control signal from the control module 5 preferably comprises timing for a start of each fuel pulse relative to a crank angle which defines a position of the piston 14 in the cylinder 15, and duration of a pulsewidth to inject a predetermined fuel mass from the injector 28 into the cylinder 15. The fuel injectors 28 are supplied pressurized fuel from a fuel distribution system (not shown). Fuel can be injected during single-injection fueling for each cylinder 15 for each combustion cycle. The engine fueling can include multiple fueling events for each cylinder 15 for each combustion cycle. The multiple fueling events can include a double-injection fueling strategy including a first fuel pulse initiated during the intake stroke of the combustion cycle, and a second fuel pulse initiated during the subsequent compression stroke.

The fuel injector 28 comprises a high-pressure solenoid-controlled fuel injector. Operating parameters include a minimum operating pulsewidth at which the solenoid-controlled fuel injector 28 can be controlled, thus establishing a minimum fuel mass delivered for a fuel pressure level. Alternatively, a fuel injector 28 may comprise a high-pressure fuel injector utilizing an alternative actuation technology, e.g., piezoelectric actuation. The alternative fuel injector 28 is controllable to deliver a minimal fuel mass for the fuel pressure level.

A spark ignition system provides electrical energy to a spark plug 26 for igniting cylinder charges in each combustion chamber 16, in response to a control signal ('IGN') from the control module 5. The control signal IGN is controlled to achieve a preferred spark ignition timing based upon a crank angle which defines the position of the piston 14 in the cylinder 15 during each engine cycle.

Various sensing devices monitor engine operation, including a rotational speed sensor 13 adapted to monitor rotational speed of the crankshaft 12, and a wide range air/fuel ratio sensor 42 adapted to monitor air/fuel ratio in the exhaust gas feedstream. The engine 10 may include a combustion sensor 44 adapted to monitor in-cylinder combustion in real-time during ongoing operation of the engine 10. The combustion sensor 44 comprises a sensor device operative to monitor a state of a combustion parameter and is depicted as a cylinder pressure sensor operative to monitor in-cylinder combustion pressure. Alternatively, other sensing systems can be used to monitor real-time in-cylinder combustion parameters which can be translated into combustion phasing, e.g., ion-sense ignition systems and non-intrusive pressure sensors.

The exhaust aftertreatment system 50 is fluidly connected to the exhaust manifold 40, preferably comprising one or more catalytic and/or trap devices operative to oxidize, reduce and combust elements of the exhaust gas feedstream, including, by way of example, a lean-NOx reduction catalyst, a three-way catalyst, an oxidation catalyst, and a particulate matter filter device. A sensor 55 monitors the exhaust gas feedstream downstream of the exhaust aftertreatment system 50, the output of which is monitored by the control module for control and diagnostic purposes.

During operation in the stratified charge combustion mode, the engine 10 preferably operates un-throttled, i.e., the throttle valve 34 at a substantially wide-open position, on gasoline or similar fuel blends over a range of engine speeds and loads. The engine 10 operates in the homogeneous charge combustion mode with the throttle valve 34 controlled for stoichiometric operation, under conditions not conducive to the stratified charge combustion mode operation, and to meet the engine load. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present disclosure.

The control module 5 preferably comprises a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 executes algorithmic code stored therein to control the aforementioned actuators to form the cylinder charge, including controlling throttle position, spark ignition timing, fuel injection mass and timing, EGR valve position to control flow of recirculated exhaust gases, and intake and/or exhaust valve timing and phasing on engines so equipped. The control module 5 can operate to turn the engine on and off during ongoing vehicle operation, and can operate to selectively deactivate a portion of the combustion chambers through control of fuel and spark and valve deactivation.

Figure 2:
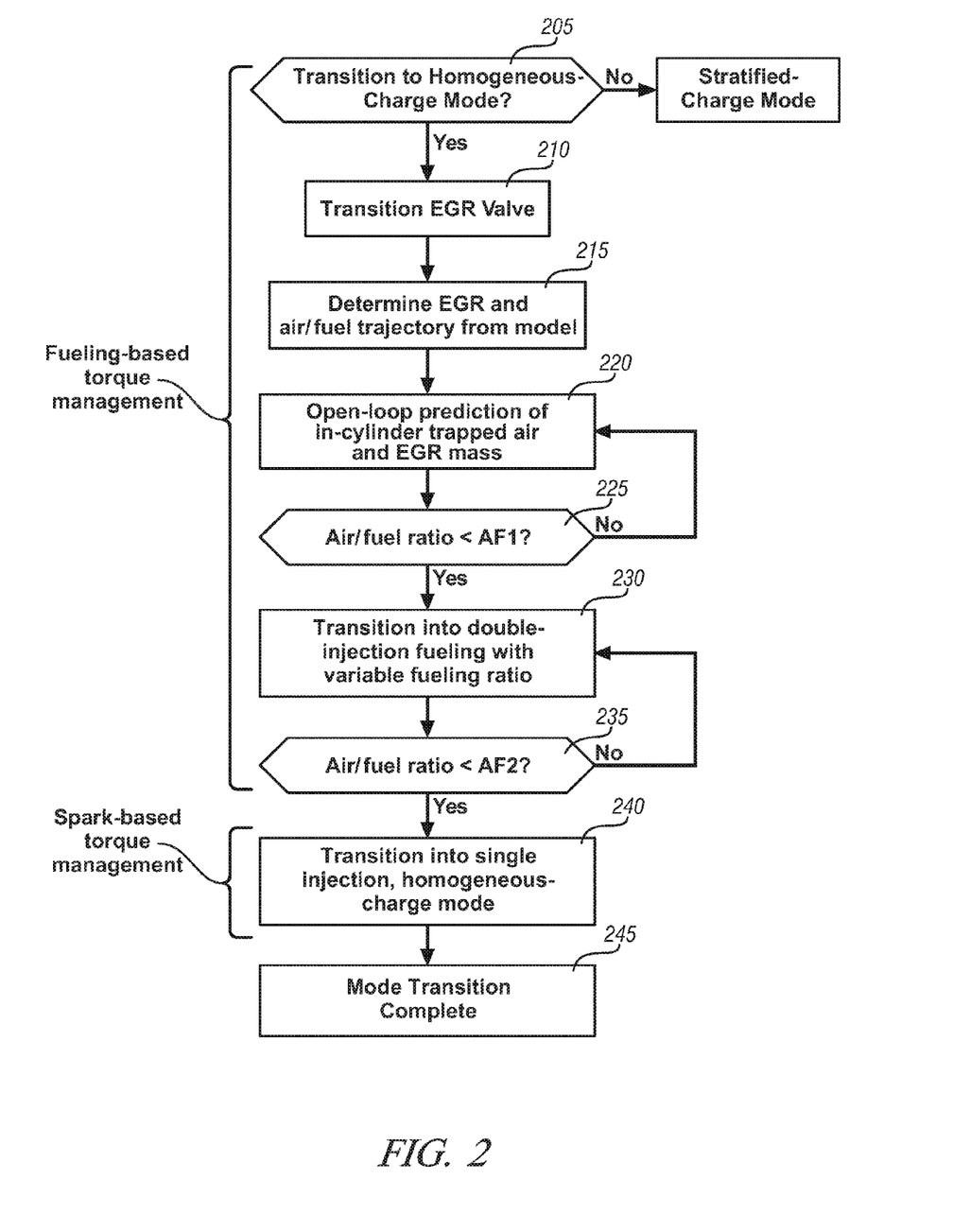
FIGS. 2 and 3 are flowcharts for control schemes, in accordance with the present disclosure.

FIG. 2 depicts a flowchart for a first control scheme for operating the engine 10. The first control scheme controls operation of the engine 10 including injector 28 during a transition from the stratified charge combustion mode to the homogeneous charge combustion mode. When the engine is operating in the stratified charge combustion mode, the control module 5 monitors engine operation and the engine load including the operator torque request. When a transition is commanded to operate the engine 10 in the homogeneous charge combustion mode (205), the control module 5 immediately commands the EGR valve 38 to a low flow or closed position. Incoming EGR mass is substantially reduced or eliminated, reducing the in-cylinder EGR mass for subsequent cylinder charges (210). This may also include reducing internally recirculated exhaust gases by reducing or eliminating any overlap between closing of the exhaust valve 18 and opening of the intake valve 20 through operation of devices 24 and 22, respectively. The throttle valve 34 is transitioned to a new position to achieve the engine output torque operating the engine 10 in the homogeneous charge mode based upon a feed-forward mass air flow model.

Figure 4:
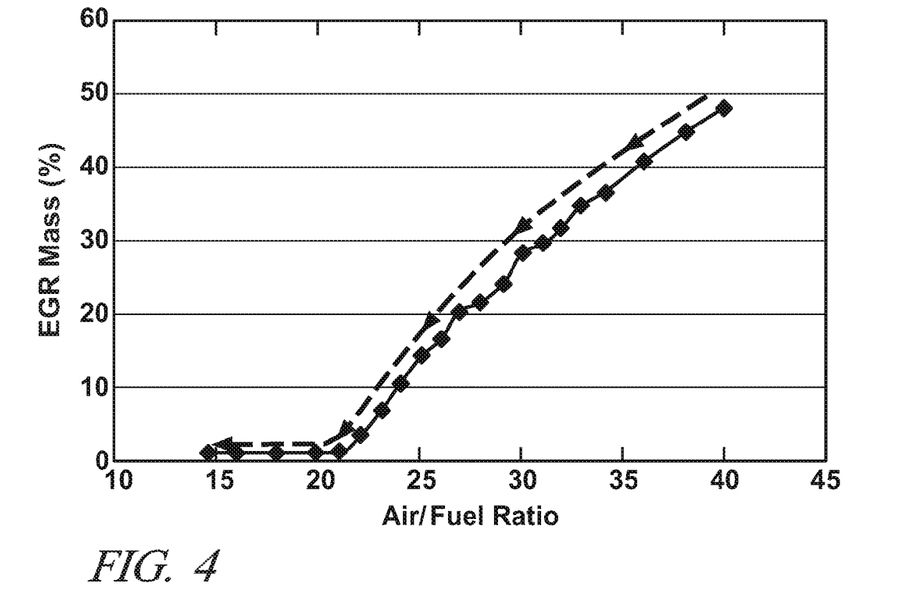
FIGS. 4-8 are datagraphs, in accordance with the present disclosure.
Figure 9:
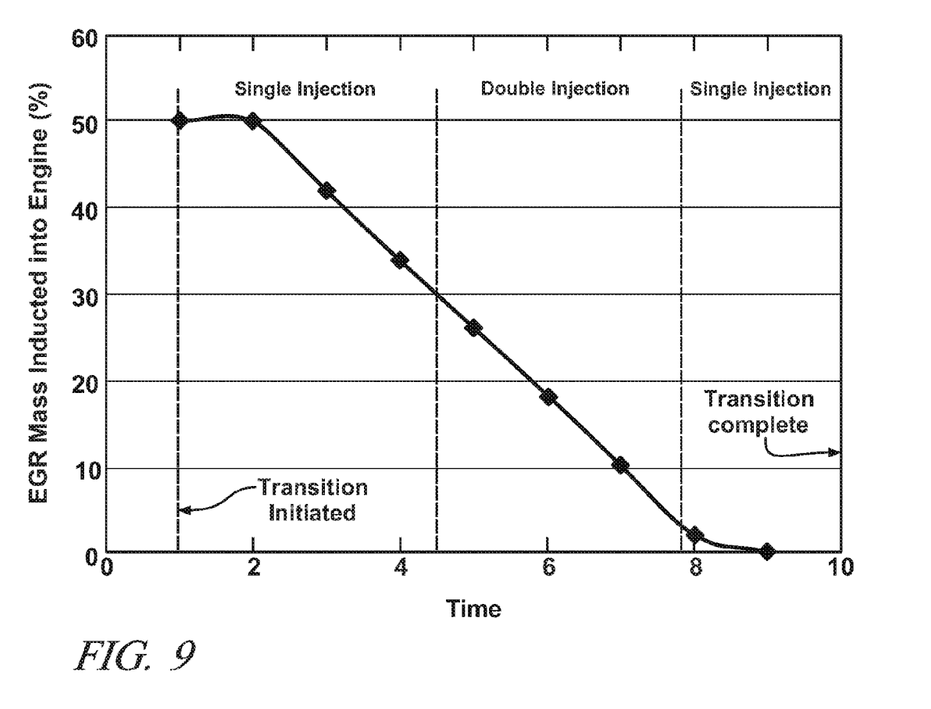
FIG. 9 is a graphical timeline, in accordance with the present disclosure.

The control module 5 estimates trajectories for simultaneously transitioning the in-cylinder EGR mass from the high-dilution in-cylinder EGR mass of the stratified charge combustion mode to the low-dilution in-cylinder EGR mass of the homogeneous charge combustion mode, and transitioning the air/fuel ratio from lean operation to stoichiometric operation (215). This is depicted in FIG. 4. An open-loop model is executed to predict in-cylinder trapped air mass and the in-cylinder EGR mass in each cylinder 16 (220) and the air/fuel ratio is calculated from the predicted in-cylinder trapped air mass and the fuel quantity injected. The air/fuel ratio is monitored using sensor 42 (225). When the air/fuel ratio is less than a first threshold, AF1 (225), double-injection fueling is initiated (230). The first threshold AF1 is preferably in the air/fuel ratio range of 25:1, and is calibratable. The double-injection fueling includes a first fuel pulse during the intake stroke and a second fuel pulse during the subsequent compression stroke, preferably just prior to initiating spark ignition. A ratio of mass of fuel injected during the first and second fuel pulses begins at a first ratio, with an increasing amount of fuel delivered during the first fuel pulse and a decreasing amount of fuel delivered during the second fuel pulse as the air/fuel ratio becomes richer (230). When the air/fuel ratio is less than a second threshold, AF2 (235), the fuel injection control transitions to single-injection fueling (240). The second threshold is dependent upon the capability of the fuel injector 28, including the minimum operating pulsewidth and corresponding minimum fuel mass, and is preferably measured using the air/fuel ratio monitored using the air/fuel ratio sensor 42. The control scheme transitions the engine operation to the single-injection fueling when the ratio of the mass of fuel injected during the first and second fuel pulses decreases to the point that the second fuel pulse is at the minimum operating pulsewidth. The single-injection fueling is preferably executed during the intake stroke, with engine output torque management executed by controlling spark ignition timing, to complete the transition to the homogeneous charge combustion mode (245). FIG. 9 shows a graphical timeline for the in-cylinder EGR mass in the engine 10 during the transition from the stratified charge combustion mode to the homogeneous charge combustion mode for the first embodiment. The transition is shown as being initiated at about 1 second into the trace, and the fuel injection comprises single-injection fueling during the compression stroke. The in-cylinder EGR mass in the engine 5 reduces over time as incoming air mixes with recirculated exhaust gases already present in the air intake system 30. Subsequently, the double-injection fueling is initiated, based upon the monitored air/fuel ratio, occurring after about 3½ seconds after initiating the transition. Subsequently, the single-injection fueling is initiated with the single fuel pulse initiated during the intake stroke, after an elapsed time of about 7 seconds. Although not depicted, the elapsed time for the transition from the stratified charge combustion mode to the homogeneous charge combustion mode can occur in about 1 to 2 seconds, depending upon physical limits and characteristics of the intake system of the engine, engine operating conditions and other factors. In specific instances, the elapsed time for the mode transition can be altered. An example includes operating the engine at idle, where there is a need to regenerate an element of the exhaust aftertreatment system 50, e.g., operating in the homogeneous charge mode at a rich air/fuel ratio to regenerate a lean-NOx reduction catalyst. Such an operation scheme can cause engine noise and vibration, and is resolved by a slower elapsed time for the transition.

The control module 5 estimates trajectories for simultaneously transitioning the in-cylinder EGR mass from the high-dilution in-cylinder EGR mass of the stratified charge combustion mode to the low-dilution in-cylinder EGR mass of the homogeneous charge combustion mode.

Figure 8:
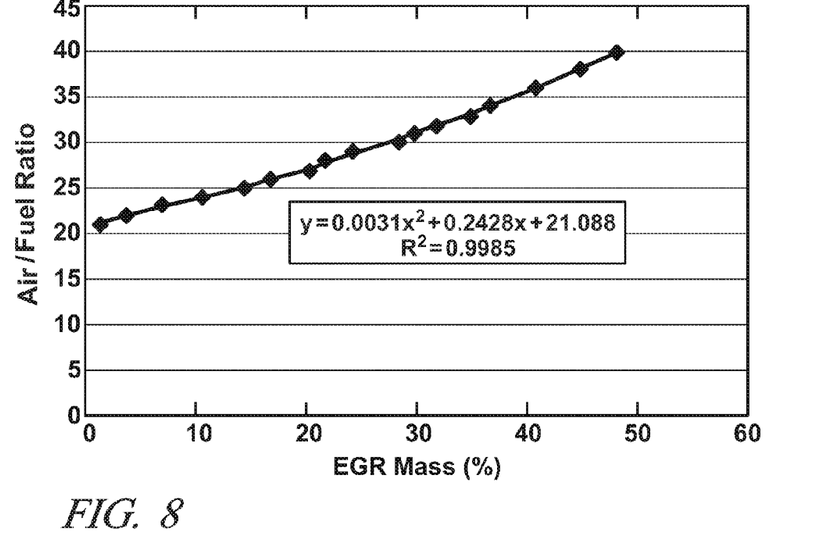

The in-cylinder EGR mass can be calculated using a dynamic executable model of air flow of the intake manifold 30. As shown in FIG. 8, a commanded air/fuel ratio can be determined based upon the in-cylinder EGR mass, using a model derived using experimental data for the engine 10, and depending upon engine speed and load data. An exemplary calibration is depicted in FIG. 8, with a variable y, representing air/fuel ratio, calculated based upon the x value, comprising the in-cylinder EGR mass, in the following equation:

$$y=0.0031x^2+0.2428x+21.088 \tag{1}$$

The engine fueling can be determined based upon the engine output torque to meet the engine load including the operator torque request and other engine loads, and the final mass air flow can be estimated using open loop calculations of mass airflow based upon measured airflow through the air meter 32, the engine speed from the crank sensor 13 and manifold air pressure from the pressure sensor 36. The final mass air flow is used by the control module 5 to drive the position of the throttle valve 34. During the transition, a combination of the engine fueling and the position of the throttle valve 34 are used to manage the engine load and the air/fuel ratio as described in FIG. 8. FIG. 8 depicts the air/fuel ratio as the EGR level is reduced during the transition. The position of the throttle valve 34 is controlled using the feed-forward mass air flow model, and the desired in-cylinder EGR mass and air/fuel ratio trajectories are model-based and calibrated using engine testing. The position of the throttle valve 34 is controlled to achieve the trajectories for the air/fuel ratio and the in-cylinder EGR mass based upon the predicted in-cylinder trapped air mass and the in-cylinder EGR mass during the transition.

Figure 5:
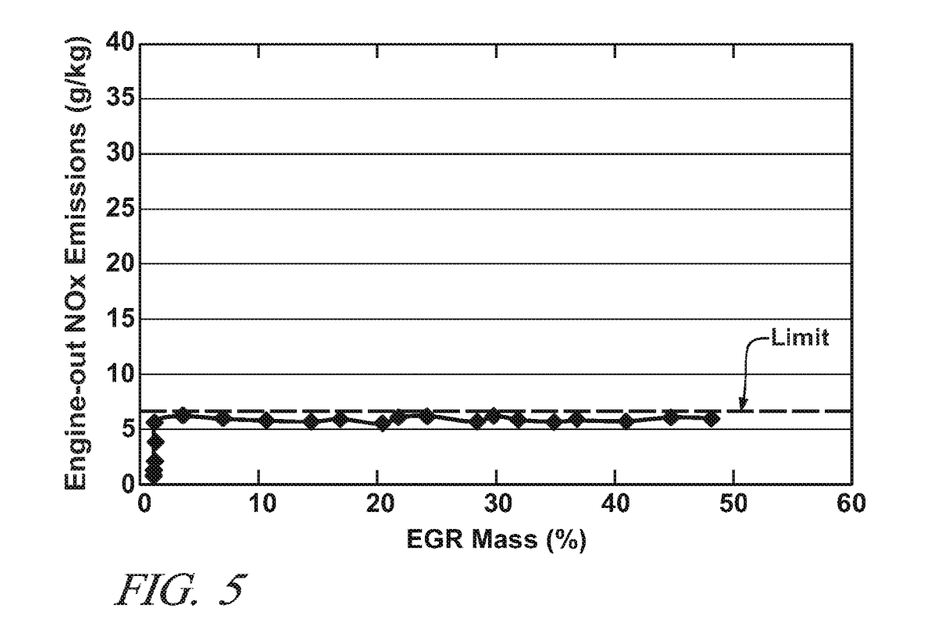

FIG. 5 shows results for operating an exemplary engine, indicating that engine-out NOx emissions (in g/kg) can be controlled below a limit of 6 g/kg with the in-cylinder EGR mass ranging from less than 5% of the cylinder charge, as may occur during the homogeneous-charge operation, to 50% of the cylinder charge, as may occur during the stratified charge combustion mode. As illustrated, using and accounting for the in-cylinder EGR mass during the mode transition reduces the engine-out NOx emission levels. Performance of the aftertreatment system 50 can deteriorate with increasing engine-out NOx emissions level and decreasing air/fuel ratio that occur during the mode transition.

Figure 6:
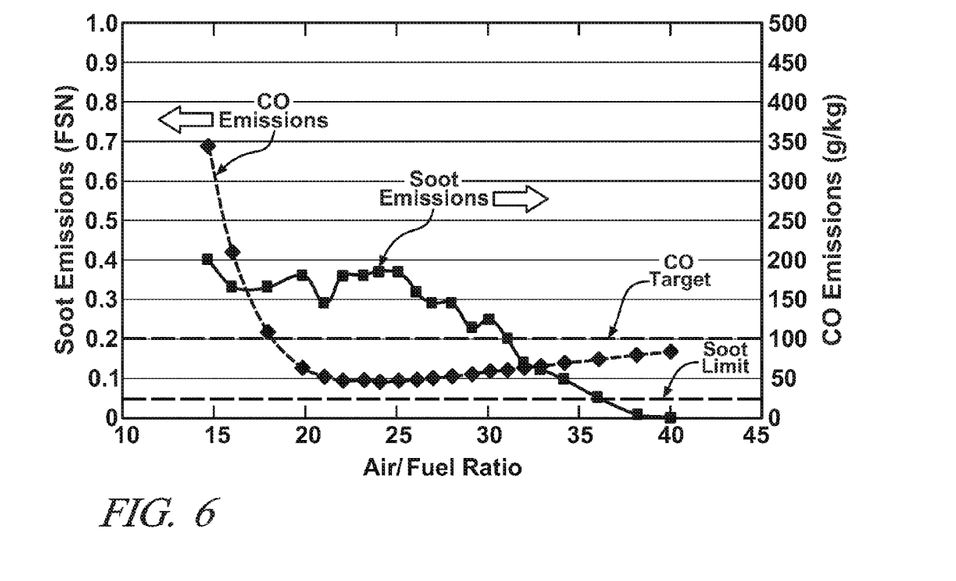

FIG. 6 depicts soot emissions, in units of Filter Smoke Number ('FSN'), and CO emissions, having units of g/kg, plotted as a function of air/fuel ratio for an exemplary engine built in accordance with the disclosure, including operating using single-injection fueling during the compression stroke, which demonstrates that the soot and CO emission levels increase rapidly as the exemplary engine 10 operates at richer air/fuel ratios when using the single-injection fueling strategy in the stratified charge combustion mode, as a result of locally rich air/fuel mixtures.

Figure 7:
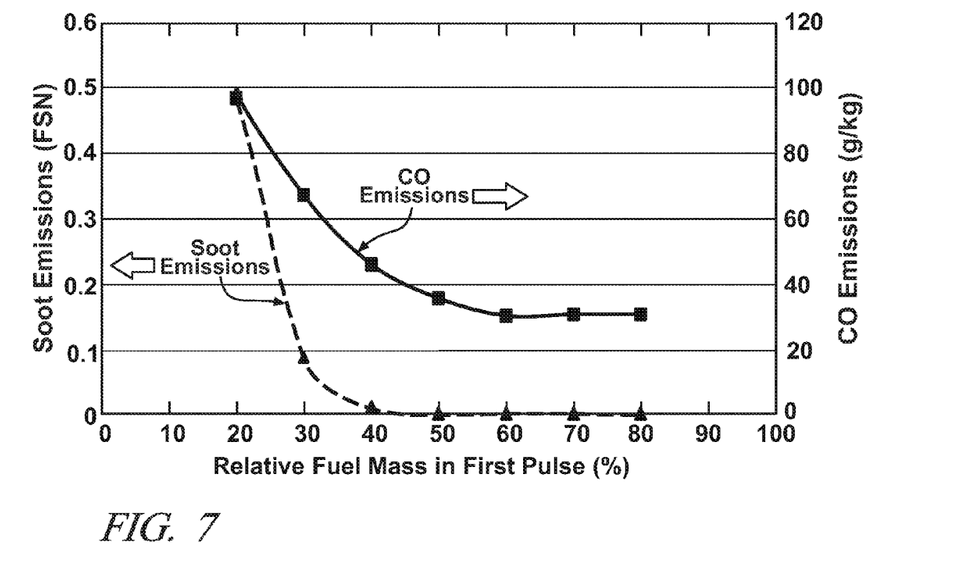

FIG. 7 depicts results for operating an exemplary engine utilizing the double-injection fueling strategy including a mixed mode fueling strategy to manage the locally rich mixture occurring during the transition from the stratified charge combustion mode to the homogeneous charge combustion mode where the air/fuel ratio is richer compared to a nominal calibrated level for the stratified-charge combustion mode. The mixed mode fueling strategy refers to the double-injection fueling with a first fuel pulse injected during the intake stroke for homogeneous fueling, and the second fuel pulse occurring during the compression stroke for stratified fueling. When the exemplary engine is operated with different levels of fuel in the first and second fuel pulses, higher CO and soot emission levels occur when a greater mass of fuel is injected in the second fuel pulse, similar to the single-injection stratified-charge combustion mode case depicted in FIG. 6. The CO and soot emission levels reduce as a portion of the fuel is injected earlier, specifically during the induction stroke. Thus, there is a change in soot emissions and CO emissions as a function of the relative fuel mass in the first fuel pulse including reductions in both CO emissions and soot when increasing the relative fuel mass in the first fuel pulse.

Figure 3:
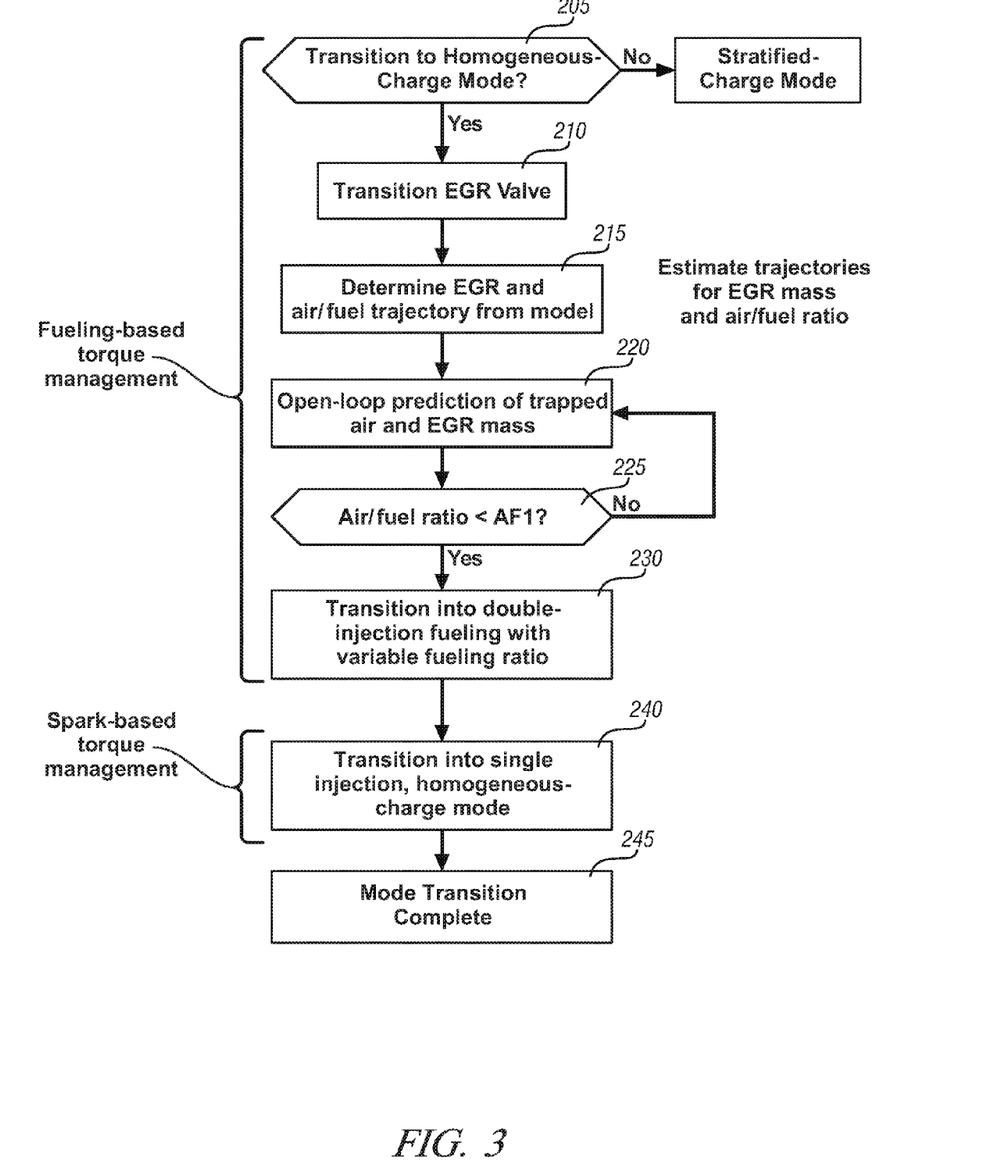

FIG. 3 depicts a flowchart for a second control scheme for operating the engine 10. The second control scheme controls operation of the engine 10 including injector 28 comprising alternative actuation technology, e.g., piezoelectric actuation, during the transition from the stratified charge combustion mode to the homogeneous charge combustion mode. The fuel injector 28 is controllable to deliver a minimal fuel mass during each fuel pulse, and the transition from the double-injection fueling (230) to the single-injection fueling (240) during the intake stroke is completed (245) without resorting to forcing the transition based upon the predetermined air/fuel ratio that is described with reference to FIG. 2.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a spark-ignition, direct-fuel injection internal combustion engine, comprising:
    commanding the engine to transition from operating in a stratified charge combustion mode to operating in a homogeneous charge combustion mode;
    substantially completely discontinuing external EGR flow;
    estimating an in-cylinder trapped air mass and in-cylinder EGR mass;
    determining trajectories for an air/fuel ratio and the in-cylinder EGR mass, and controlling throttle position and engine fueling to achieve said trajectories;
    monitoring the air/fuel ratio;
    initiating double-injection fueling for each combustion cycle when the air/fuel ratio is less than a first predetermined threshold; and
    initiating single-injection fueling for each combustion cycle and executing spark retard management to control the engine output torque when the air/fuel ratio is less than a second predetermined threshold.

2. The method of claim 1, further comprising controlling the throttle position and the engine fueling to achieve the trajectories for the air/fuel ratio and the in-cylinder EGR mass with engine operation in the homogeneous charge combustion mode.

3. The method of claim 1, comprising controlling the throttle position to control intake air flow to achieve the trajectories for the air/fuel ratio and the in-cylinder EGR mass during the transition from the stratified charge combustion mode to the homogeneous charge combustion and to meet an engine output torque.

4. The method of claim 3, wherein the trajectory for the air/fuel ratio comprises a transition from a lean air/fuel ratio during the operating in the stratified charge combustion mode to a stoichiometric air/fuel ratio during the operating in the homogeneous charge combustion mode.

5. The method of claim 3, wherein the trajectory for the in-cylinder EGR mass comprises a transition from a high dilution during the operating in the stratified charge combustion mode to a substantially limited dilution during the operating in the homogeneous charge combustion mode.

6. The method of claim 1, comprising estimating the in-cylinder trapped air mass and the in-cylinder EGR mass based upon a feed-forward intake manifold flow model.

7. The method of claim 1, wherein initiating the double-injection fueling comprises injecting a first fuel pulse during an intake stroke and injecting a second fuel pulse during a subsequent compression stroke.

8. The method of claim 7, comprising increasing mass of the first fuel pulse and decreasing mass of the second fuel pulse based upon the predetermined trajectory for the air/fuel ratio.

9. The method of claim 1, wherein initiating the single-injection fueling comprises initiating a single fuel pulse during the intake stroke.

10. The method of claim 1, wherein substantially completely discontinuing the external EGR flow comprises closing an exhaust gas recirculation valve.

11. Method transitioning operation of a spark-ignition, direct-fuel injection internal combustion engine from a stratified charge combustion mode to a homogeneous charge combustion mode, comprising
estimating an in-cylinder trapped air mass and an in-cylinder EGR mass;
controlling a throttle position, an EGR valve position, and engine fueling to achieve trajectories for an air/fuel ratio and the in-cylinder EGR mass, said trajectories based upon the estimated in-cylinder trapped air mass and the in-cylinder EGR mass;
monitoring the air/fuel ratio;
initiating double-injection fueling when the air/fuel ratio is less than a first predetermined threshold; and
initiating single-injection fueling during each intake stroke when the air/fuel ratio is less than a second predetermined threshold.

12. The method of claim 11, further comprising controlling throttle position and the EGR valve position to achieve an engine output torque based upon the trajectories for the air/fuel ratio and the in-cylinder EGR mass and based upon engine operation in the homogeneous charge combustion mode.

13. The method of claim 11, comprising controlling the EGR valve position to substantially completing discontinuing external EGR flow.

14. Method for operating a spark-ignition, direct-fuel injection internal combustion engine selectively operative in one of a plurality of combustion modes, comprising:
commanding a transition from a stratified charge combustion mode to a homogeneous charge combustion mode;
controlling an EGR valve to a preferred position for operating the engine in the homogeneous charge combustion mode;
estimating an in-cylinder trapped air mass and an in-cylinder EGR mass;
controlling throttle position and engine fueling to meet an engine output torque based upon engine operation in the homogeneous charge combustion mode and based upon predetermined trajectories for the exhaust air/fuel ratio and the in-cylinder EGR mass determined based upon the estimated mass of trapped air and the in-cylinder EGR mass;
monitoring air/fuel ratio;
initiating double-injection fueling when the air/fuel ratio is less than a first predetermined threshold; and
initiating single-injection fueling during the intake stroke and executing spark retard management to control the engine output torque when the air/fuel ratio is less than a second predetermined threshold.

15. The method of claim 14, further comprising controlling the throttle position to achieve the trajectories for the air/fuel ratio and the in-cylinder EGR mass determined based upon the estimated in-cylinder trapped air mass and the in-cylinder EGR mass and engine operation in the homogeneous charge combustion mode and to meet the engine output torque.

16. The method of claim 14, comprising controlling the throttle position and engine fueling to control intake air flow to achieve the trajectories for the air/fuel ratio and the in-cylinder EGR mass during the transition from the stratified charge combustion mode to the homogeneous charge combustion and to meet the engine output torque.

17. The method of claim 16, wherein the trajectory for the air/fuel ratio comprises a substantially linear transition from a lean air/fuel ratio during the operating in the stratified charge combustion mode to a stoichiometric air/fuel ratio during the operating in the homogeneous charge combustion mode.

18. The method of claim 16, wherein the trajectory for the in-cylinder EGR mass comprises a transition from a high dilution during the operating in the stratified charge combustion mode to a substantially limited dilution during the operating in the homogeneous charge combustion mode.

19. The method of claim 14, comprising estimating the in-cylinder trapped air mass and the in-cylinder EGR mass based upon a feed-forward mass air flow model.

20. The method of claim 14, comprising controlling the elapsed time foe the transition from the stratified charge combustion mode to the homogeneous charge combustion mode.

* * * * *